United States Patent [19]
Demetrescu

[11] 3,805,083
[45] Apr. 16, 1974

[54] VIBRATING-TO-ROTARY ENERGY CONVERTER

[76] Inventor: Mihai C. Demetrescu, 17761 Palmento Way, Irvine, Calif. 92664

[22] Filed: Apr. 13, 1973

[21] Appl. No.: 351,059

[52] U.S. Cl. .................... 290/1, 310/80, 123/197, 310/273
[51] Int. Cl. ............................................. H02p 9/04
[58] Field of Search ........... 123/197 AC, 146, 46 E; 290/1, 5, 49; 310/80, 37, 38, 273

[56] References Cited
UNITED STATES PATENTS

| | | | |
|---|---|---|---|
| 3,206,609 | 9/1965 | Dawes | 290/1 |
| 3,161,793 | 12/1964 | Laithwaste | 290/1 |
| 3,290,525 | 12/1966 | Sudmeier | 290/1 |
| 2,992,343 | 7/1961 | Schmidt et al. | 290/1 |
| 2,904,711 | 9/1959 | Colgate | 290/1 |

Primary Examiner—G. R. Simmons
Attorney, Agent, or Firm—Nilsson, Robbins & Berliner

[57] ABSTRACT

A conversion system is disclosed utilizing certain a. c. electrical motor principles to provide rotary energy from a source of reciprocating energy. The illustrative configuration includes a rotor of the type employed in induction motors. Outside the rotor is a concentrically mounted stator for supporting the structure and controlling magnetic flux patterns. Also in concentric relationship with the rotor and outside the stator is a vibrating element, for supplying alternating magnetic flux. That is, the vibrating element carries magnetic poles and field windings so that as it oscillates, an alternating magnetic flux is generated through the stator to develop rotary energy on the rotor. In the illustrative embodiment, the vibrating or oscillating structure is coupled to an internal-combustion resonance engine. Specifically, the oscillating structure is carried on springs and connected to the reciprocating piston of the engine. Control means is provided for actuating the engine in accordance with the amplitude of oscillations and current power demands.

14 Claims, 5 Drawing Figures

PATENTED APR 16 1974
3,805,083
SHEET 1 OF 2
FIG 1
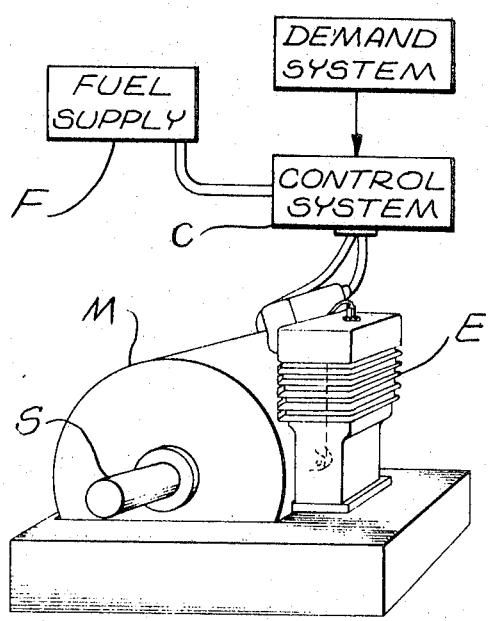
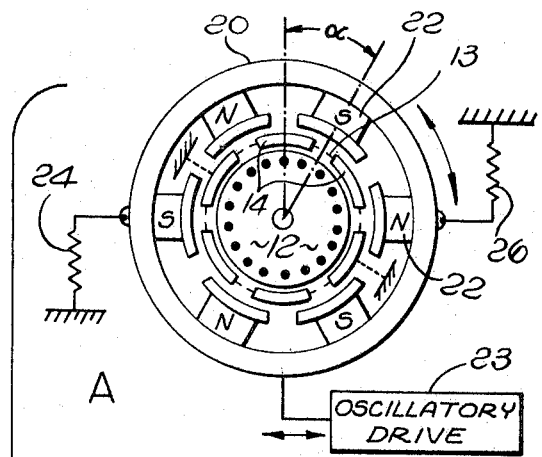
A
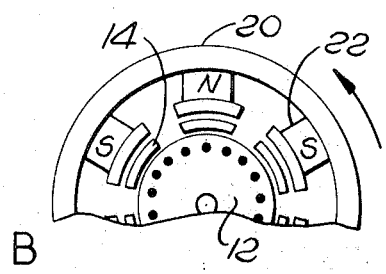
B
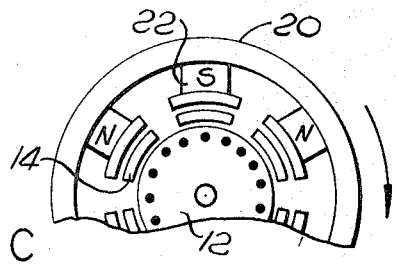
C
FIG. 2.
FIG. 3.
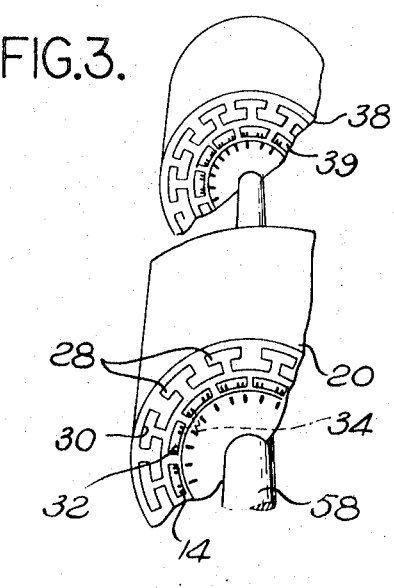
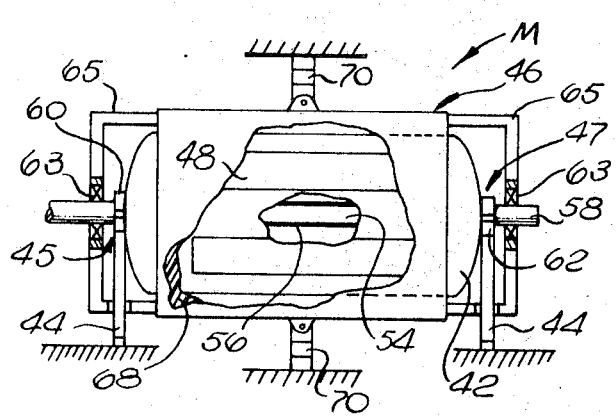
FIG. 4.

3,805,083

VIBRATING-TO-ROTARY ENERGY CONVERTER

REFERENCE

This application incorporates subject matter of Disclosure Documents 009927 and 014144 filed in the Patent Office as well as the primary subject matter of Disclosure Document 016782, filed in the United States Patent Office on Feb. 13, 1973.

BACKGROUND AND SUMMARY OF THE INVENTION

Reciprocating thermodynamic machines, e.g., internal combustion engines, are extensively used as sources of motive power in transportation as well as certain stationary applications. Vast capabilities exist for producing and servicing such engines as used in automobiles. However, these engines have been challenged as a source of pollution.

Generally, contaminants from an engine are related to the quantity of fuel burned. Accordingly, an engine of increased efficiency and improved fuel control is less polluting. Therefore, a considerable need exists for an engine bearing structural similarities to conventional internal combustion engines, however, capable of significantly improved efficiency and burning control.

To adapt the power delivered by a reciprocating engine to specific applications, several energy converters are employed. Generally, the initial conversion of mechanical energy in a reciprocating engine involves the change from linear or reciprocating motion to rotary motion, which occurs conventionally between the engine pistons and the rotating crank shaft. That conversion generally involves a rather substantial energy loss with attendant loss of efficiency. The present invention contemplates application to replace that arrangement and more generally relates to an improved system for converting reciprocating energy into rotary energy, which system is relatively efficient, simple and effective. That is, while recognizing that the conversion system of the present invention is well suited to use in cooperating with a reciprocating internal-combustion engine, it is to be appreciated that the structure may well be applicable to diverse other applications involving the conversion of reciprocating energy to mechanical rotary energy.

The combination that includes a conversion system in accordance with the present invention with a reciprocating engine, affords particular and unobvious advantages. For example, such a combination incorporating a new class of engines, e.g., resonance engines, takes on particular significance. Also, applications involving relatively-high frequencies of ocsillation are readily accommodated by the present system.

The most-pertinent art known to the present inventor in relation hereto is generally related to systems incorporating reciprocating engine elements with electromechanical elements. Specifically, such art is represented by the following United States Pat. Nos. 2,829,296 (Jarret et al); 2,904,701 (Colgate); 2,966,148 (Jarret et al); 3,206,609 (Dawes); and 3,510,703 (Klaue).

The system of the present invention may be embodied to utilize electrical elements that may be generally considered as: a rotor, a stator and a vibrator or an oscillating member. In one form, the rotor may comprise an induction (squirrel cage) structure supported for rotary motion by the stationary stator which also includes a plurality of arcuate magnetic members for directing magnetic flux. The vibrating or oscillating structure produces flux and includes alternator field windings and magnetic poles that are rotatively oscillated (as by a reciprocating engine) with the result that the rotor experiences a magnetic drive force to produce rotational mechanical energy.

BRIEF DESCRIPTION OF THE DRAWINGS

The drawings, disclosing an illustrative embodiment of the present invention, and which serve to present the various objectives and advantages hereof, are as follows:

FIG. 1 is a perspective and diagrammatic view of an embodiment of the present invention;

FIG. 2 shows sectional diagrams illustrative of the operating philosophy of the system of FIG. 1;

FIG. 3 is a fragmentary sectional view of a portion of the structure of FIG. 1;

FIG. 4 is a sectionalized side elevation of another portion of the structure of FIG. 1.

DESCRIPTION OF THE ILLUSTRATIVE EMBODIMENT

Figure 5:
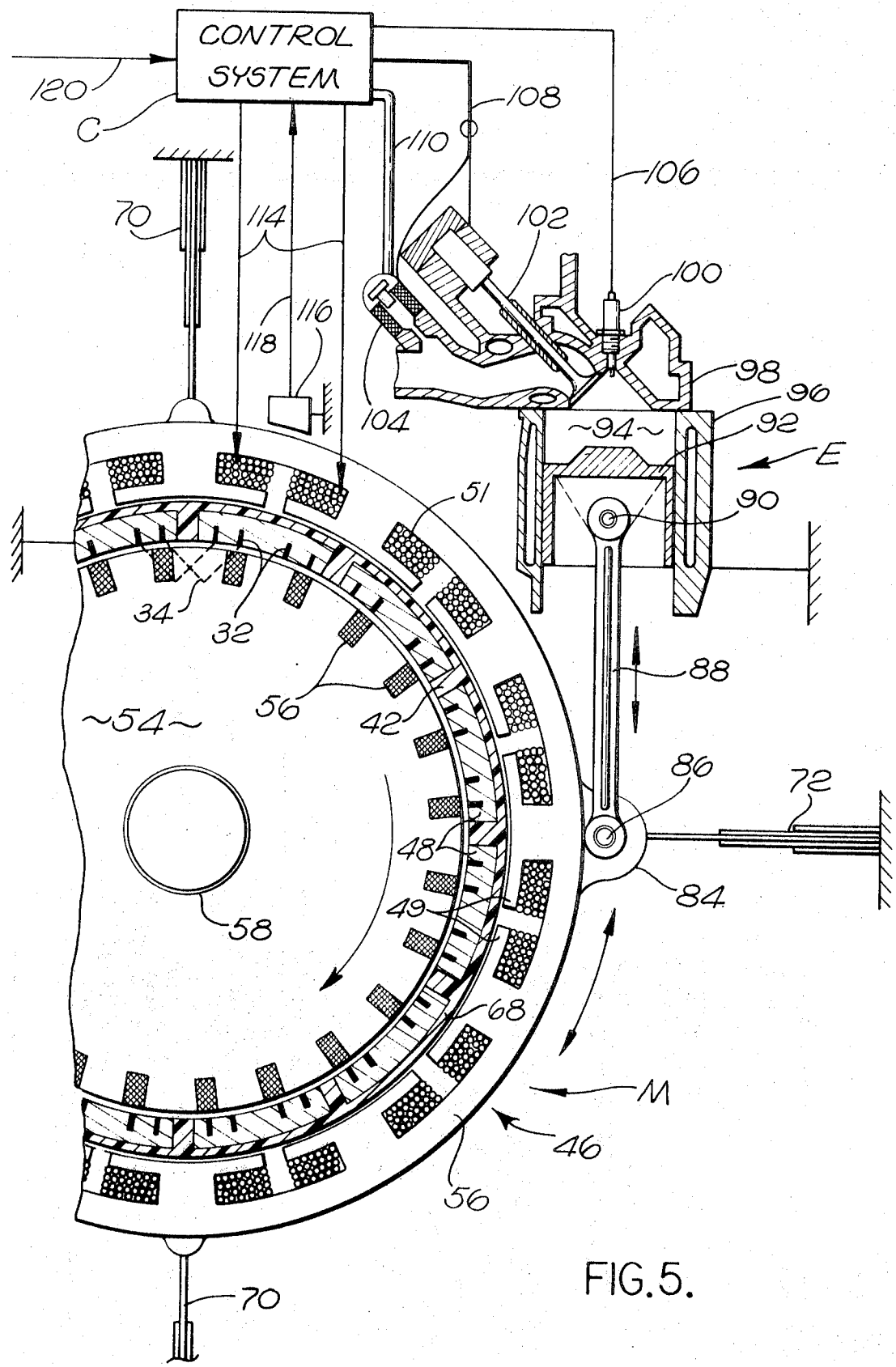
FIG. 5 is a detailed sectional view taken vertically through the structure of FIG. 1.

The disclosed embodiment exemplifies the invention which, of course, may be embodied in other forms, some of which may be radically different from the embodiment presently deemed best and disclosed herein. However, the specific structural and functional details disclosed herein are representative and provide the basis for the claims herein which define the scope of the invention.

Referring initially to FIG. 1, there is shown an embodiment of the present invention which receives combustible fuel from a supply F, and provides rotary power at a drive shaft S. The fuel from the supply F passes through a control system C to an engine component E in which the fuel is burned to provide expanding gases for actuating an internal piston (not shown in FIG. 1). Rather than acting upon conventional rods or other couplings that are traditionally employed for the conversion of reciprocating energy into rotary energy, the piston in the engine E acts to oscillate a spring-mounted unit (not shown in FIG. 1) incorporated in a motor structure M. The oscillating motion applied by the engine component E within the motor structure M develops torque at the drive shaft S.

Preliminary to considering the detailed structure of the system of FIG. 1, some initial consideration will be given to the operating philosophy whereby reciprocating motion is converted into rotary motion. Generally, the system of the present invention may be embodied in forms that are variously related to conventional a. c. electric motors, e. g., structures with revolving fields, structures with revolving armatures and so on. The exemplary simplified structures illustrated in FIG. 2 are identical and illustrate a revolving rotor 12. Outside the rotor 12, a concentric cylindrical configuration 13 supports a series of spaced-apart, arcuate stator magnetic elements 14.

At a location external of the stator configuration 13, a rotatively vibrating member 20 is provided, carrying a plurality of magnetic poles 22, and supported for rotation through a limited angle, as symbolically represented by springs 24 and 26. An oscillatory drive 23 actuates the member 20. The FIGS. 2a, 2b, and 2c illustrate states of angular displacement by the member 20 in relation to the stator configuration 13 and are referred to below in explaining the development of motive power forces in the rotor 12.

Each of the poles 22 includes a field winding for providing magnetic flux in polar relationship as indicated by the letters "N" (north) and "S" (south) in accordance with convention. In the positional relationship illustrated in FIG. 2a, which is the resting position when no external force is applied, the flux from each pair of adjacent north and south poles 22 is "shorted" by a contiguous underlying stator element 14. That is, each of the armature-composition stator elements 14 is subjected to somewhat balanced portions of adjacent pairs of north and south poles 22. As a consequence, when the structure is in the state of FIG. 2a, the major portion of the magnetic flux from the poles 22 is shorted in the stator configuration 13 with essentially no penetration to the rotor 12.

Assuming now that the oscillator member 20 is revolved clockwise through an angle ($\alpha$) the positional relationship of FIG. 2b results wherein each of the stator elements 14 is aligned with a pole 22. As a consequence, the stator elements essentially become extensions of the poles with the result that full driving magnetic flux circuits are established through the rotor 12.

When member 20 revolves counter-clockwise to complete one cycle of oscillation, it reaches the position illustrated in FIG. 2c, after it has passed again the equilibrium position of FIG. 2a. As is obvious, the magnetic flux through each of the stator polar pieces is now reversed.

It is thus apparent that the flux acting upon the rotor 12 is generally similar to that of a single-phase induction motor, i.e., an oscillating pattern of intensifying and diminishing flux. As well known, at a standstill the single-phase induction motor has zero torque. However, a variety of techniques and structures are widely employed to start such motors. After starting, the field resulting from the component current produced in the rotor of such a motor has an axis rotationally displaced in space with respect to the field of the stator. Accordingly, the offset field relationship results in a developed torque that is produced by the motor. Generally, similar starting techniques and structures may be employed to start a motor constructed in accordance with the present invention. Alternatively, a mechanical starter could be embodied as well known in the prior art.

Although the single-phase induction motor is recognized to have a revolving magnetic field, a simple explanation for the development of such a field is not generally well known. In view of that consideration, recognizing first the similarity of applicant's developed field pattern to that of a single-phase induction motor, is deemed to provide an adequate basis for understanding the operation of the present invention. However, to resolve the possibility of doubt, a somewhat-mathematical supplemental explanation will also be provided. At the outset, the power absorbed in an electrical induction motor can be expressed as:

$$W_{a.c.} = 1/T \int_0^T e \cdot i \cdot dt = E \cdot I \cdot \cos \psi + RI^2 \quad (1)$$

where:
$e = \sqrt{2} E \sin (\omega t + \psi)$
$i = \sqrt{2} I \sin \omega t$ and
$\omega = T$ $E$ and $I$ are the r.m.s. values of the voltage and current respectively and $R$ is the d.c. resistance of the winding. Since the efficiency of electric motors is high (>90 percent), the term $RI^2$ is small with respect to $E \cdot I \cdot \cos \psi$ and usually represents less than 5 percent of total power. At this point, it should be stressed that the whole electrical energy to be converted into mechanical energy is transferred to the variable (sinusoidal) magnetic flux circulating through the unit. The angle $2\alpha$ represents the angular polar pitch. Therefore, for a given construction of the machine, the mechanical power delivered will be a function of the flux density $b$ produced by, and in phase with, the current $i$. It can thus be written:

$$b = B \sin \omega t,$$

(2)

keeping in mind that the same $B$ will result in the same power being produced, under similar conditions.

In the system as disclosed in FIG. 2a, $B_o$ is created by applying to the coils a d.c. equal in intensity with $\sqrt{2} I$, where $I$ is the r.m.s. current of relation (1). Because of the symmetrical position of the stator elements 14 with respect to the poles 22, the total flux in the elements 14 is nil.

If a force $f$ induces a rotation of $\theta$ degrees of the external member 20, the magnetic flux through each element 14 will change and become different from zero, as shown in FIG. 2b. One of the elements 14 will transfer a flux; the flux transferred by each of the stator elements 14 of the illustrative system may be expressed as:

$$\phi_1 = (\alpha + \theta) \, rl \, B_o$$

where $\alpha$ is the angle indicated above, $\theta$ is the degrees of actual offset by the vibrating member 20, $r$ is the active radius, $l$ is the length of the pole, and $B_o$ is the magnetic field from the coils.

Somewhat similarly, however, because the direction of $B_o$ is reversed, the adjacent pole will transfer:

$$\phi_2 = (\alpha - \theta) \, rl \, (-B_o)$$

(3)

The total flux through one of the elements 14, accordingly, is:

$$\phi = \phi_1 + \phi_2 = rl \, B_o[(\alpha + \theta) - (\alpha - \theta)] = 2 \, rl \, B_o \, \theta$$

(4)

If the force $f$ applied to the oscillating member 20 is periodic, the following expression will apply:

$$f = \sqrt{2} F \sin (\omega t + \psi)$$

(5)

Then as the amplitude of the resulting motion is $r\theta$ at the level of the poles 22:

$$r\theta = r\theta_o \sin \omega t, \text{ or}$$

(6)

$$\theta = \theta_o \sin\omega t$$

Generally, an operating embodiment of the present invention will be designed so that the maximum rotation is limited to the angle $\alpha$ (one-half the polar pitch) with the consequence that the above expression (6) may be reduced to:

$$\theta = \alpha \sin\omega t \tag{7}$$

where $\alpha$ is the maximum deflection, when only one of the poles 22 faces a stator element 14. At maximum deflection ($\theta=\alpha$), substantially all the flux $B_o$ is circulating through each pole 22, the sign changing from one pole to the next. From the relations set forth above, a combination of the expressions (4) and (7) will produce:

$$\phi = 2\,rl\,B_o\,\theta = 2\,rl\,B_o\alpha\,\sin\omega t \tag{8}$$

The flux density per pole ($b = \phi/2r\alpha l$) will therefore be:

$$b = 2\,rl\alpha B_o\,\sin\omega t / 2r\alpha l = B_o\,\sin\omega t \tag{9}$$

which is equivalent to relation (2) stated above where $B_o = B$.

Thus, it may be seen that an alternating magnetic flux is created by the mechanical vibration, substantially identical with the flux created by an alternating current power source in a single-phase induction motor. The effect on the rotor of such flux patterns is essentially the same; however, as the flux through the poles 22 is not variable in the case of mechanical vibration, there is essentially no e.m.f. induced in the coils and the requisite direct current voltage for excitation may be very low.

The oscillating mechanical power delivered to the system is:

$$W_m = 1/T \int_0^T f r d\theta = FX \cos\psi \tag{10}$$

where $X = r\alpha/\sqrt{2}$.

Accordingly, the total power is:

$$W_{tot} = F X \cos\psi + RI^2 \tag{11}$$

which is essentially the mechanical equivalent of the initial relationship (1) indicated above. Accordingly, the alternating flux induced by mechanical vibration in a system in accordance herewith may be seen to be similar to the flux induced by an alternating current in an induction motor having essentially the same size rotor. Operation of the rotors is, therefore, similar to provide a drive torque.

Preliminary to considering a more complete embodiment of the present invention, some detailed structural additions to the illustrative diagrams of FIG. 2 should be indicated. It is to be appreciated that rather than the salient-pole configuration as depicted in FIG. 2, windings will normally be distributed in slots. Also, a multiple-phase machine may be provided in accordance with the present invention. Furthermore, more nearly sinusoidal space flux patterns are desired in order to achieve revolving magnetic fields as in polyphasic electric machines. These considerations are pertinent with regard to FIG. 3 representing structure as treated in more complete detail below. First, as illustrated in FIG. 3, windings 28 are distributed in slots 30 rather than being positioned about salient poles. Second, a sinusoidal space-distribution of the flux resulting in the elements 14 from the oscillatory motion of windings 28 is accomplished by windings 32 affixed in the stator elements 14. As illustrated, four slots are provided in each of the elements 14; and coils are provided connected in short circuit and in offset relationship as indicated by dashed lines 34. The alternating flux through each element 14 will induce a potential and thus a current in each of the coils 32 which will oppose the main field through the element 14. As the coils are located near the edges of the elements 14, the total field at the edge will be somewhat reduced, and the practical result is a space-sinusoidal field similar to that created by offset slot-windings in conventional alternating-current machines. The amount of energy lost by such structure is relatively small since the current circulating in coils 32 also results in an increase of the magnetic field in the center of the elements 14.

Finally, as suggested above, the system may be multiple phase. By providing a second oscillating member 38 (similar to the oscillating member 20) axially shifted with respect to the oscillating member 20, which is driven at the same frequency and with a phase delay of some 90°, a bi-phase machine results. Of course, stator elements 14 are extended axially such as to be concentric to the second member 39. The resting position of member 38 is rotated by the angle $\alpha$ (half the polar pitch) with respect to the resting position of member 20. As a result, the alternating magnetic fluxes produced by members 20 and 38 respectively are delayed by somewhat 90 electrical degrees in both time and space. As is well known from the theory of a.c. electrical machines, such a condition is necessary to achieve a revolving magnetic field which interacts with the rotor to produce a driving torque at all times. Although not the simplest, the most practical embodiment of the present invention is in a two (or more) phase machine, with phase-delayed mechanical oscillations, as explained. Such phase delays can be readily achieved by the electronic control mechanism explained below.

Considering the motor structure M (FIG. 1) in greater detail, reference will now be made somewhat concurrently to FIGS. 4 and 5. Note that FIG. 4 is progressively internally sectioned to illustrate component parts. The motor structure M includes a somewhat-cylindrical stator 42 (FIG. 4) which is rigidly supported by base elements 44 (FIG. 4) affixed at the opposed ends 45 and 47. The stator 42 is concentrically inside a cylindrical vibrating mechanism 46 (FIG. 5) and carries flux-concentrating elements 48. The vibrating mechanism 46 defines nonsalient poles 49 which carry flux-producing windings 51.

Inside the stator 42, a rotor 54 is provided incorporating a squirrel cage winding 56 as well known in the prior art. The rotor 54 incorporates an axial shaft 58 which is supported for rotation by bearings 60 and 62 (FIG. 4) disposed at the opposed ends 45 and 47 of the stator 42. Accordingly, the rotor 54 may freely turn to develop useful drive torque on the shaft 58.

Consideration will now be given to the structural details of components in the motor structure M. In addition to providing bearing support for the rotor 54, and for the vibrator 46, the stator 42 also carries the flux-concentrating elements 48. The magnetic elements 48 (FIG. 5) are disposed in a circular or radial pattern within the non-magnetic body of the stator 42, to operate upon flux from the oscillating mechanism 46. While the body of the stator 42 is formed of non-magnetic material as indicated, the elements 48 comprise effective ferromagnetic material as traditionally employed in flux circuits, e.g., armatures, or alternating-current machinery.

The stator 42 is also physically referenced to the vibrator or oscillating member 46. The vibrating mechanism 46 is also affixed to opposed pairs of leaf springs 70 and 72. Consequently, increasing rotational displacement of the mechanism 42 results in an increasing spring force. At the same time, said springs with bearings 63 on yoke 65 support the vibrator 46 relative to stator 42. Consequently, free motion is permitted with aligned concentricity.

The structure for utilization of the spring force in cooperation with reciprocating-energy forces from an internal combustion engine will now be considered.

A lug 84 (FIG. 5 right) extends from the exterior housing 66 of the oscillating mechanism 46 and supports a wrist pin 86 for receiving the lower end of a connecting rod 88. The upper end of the rod 88 is connected by a pin 90 to a piston 92 which reciprocates in the engine component E. The piston 92 is confined within a cylinder 94 defined in a block 96 as generally well known in the prior art. Also as well known in the prior art, the block 96 receives an affixed head 98 incorporating a spark plug 100, a valving structure 102 and an electrically controlled fuel injector 104. It is to be appreciated that the complete valve structure 102 is not depicted; rather, only the intake valve is represented. However, these components are deemed to be somewhat ancillary to applicant's invention; and in view of the fact that various such structures are exceedingly well known, further detail is not deemed to be appropriate herein.

The spark plug 100 is connected to the control system C through a spark wire 106. A cable 108 connects the control system C to the electrically-controlled valving structure 102 and the fuel injector 104. A duct 110 is connected from the control system C to the injector 104 for carrying fuel to the engine component E. Connections are also provided from the control system 36 to the motor structure M. Specifically, the windings 51 in the oscillating mechanism 46 are connected through conductors 114 to the control system C along with a position transducer 116 that is connected to the control system C through a conductor 118.

Treating the operation of the system in a general manner initially, charges of fuel are burned in the cylinder 94 in a timed fashion to actuate the piston 92. Each power stroke by the piston 92 is synchronized with the oscillating motion of the oscillating mechanism 46 borne on the pairs of leaf springs 70 and 72; as a result, the mechanism 46 vibrates or oscillates at a somewhat constant resonant frequency, as the propelling magnetic flux patterns are developed to drive the shaft 58 as explained in detail above.

It is significant to such operation that the combustion of a charge of fuel in the cylinder 94 is timed to increase the amplitude of oscillations by the mechanism 46, e.g., occurring essentially at the top of a stroke. In that regard, during intervals when no power is being drawn from the system, as when no load is carried on the shaft 58, the control system C initiates combustion cycles of the engine component E only upon a significant decrease in the amplitude of resonant oscillations as sensed by the transducer 116. Accordingly, the mechanical mass of the vibrating structure 46 in combination with the piston 92 and the connecting rod 88 acts in cooperation with the elastic forces of the leaf springs 70 and 72 to achieve mechanical resonance. Upon a power stroke by the engine component E to actuate the mechanism 46, such motion will continue for a number of cycles due to the free exchange of kinetic and potential energy between the masses in linear and angular motion and the elastic forces provided by the springs 70 and 72. Consequently, charges of fuel are burned to maintain the amplitude of the vibration and to supply a load that may be coupled to the shaft 58.

The detailed structure of the position transducer 116 as well as the logic and structure of the control system C may be somewhat as disclosed in the present inventor's co-pending patent application Ser. No. 314,211 filed Dec. 11, 1972. Otherwise, the control may be variously implemented with a view toward synchronizing fuel combustion to reinforce oscillatory motion.

Considering a sequence of actual operation for the system, on starting from a quiescent state, it will be necessary to initially crank the engine component E. During that period, the control system C will normally receive a signal through a line 120 indicating a zero load demand. Concurrently with the cranking operation the spark plug 100, the valve structure 102 and the fuel injector 104 are actuated, as by using techniques generally well known in the prior art for starting internal combustion engines. It is noteworthy that during the cranking operation the vibrating or reciprocating structure 46 will also be set in motion; however, the windings 51 will not be energized and consequently no energy will flow from the system.

Upon starting the engine E, a few initial power strokes (synchronized with the resonant frequency of the mechanism 46) will set the resonant system into oscillation. The windings 51 are next energized with various intensities of current, according to the demand of power to provide the field flux. As a consequence, the rotor 54 is exposed to the alternating flux pattern described in detail above, which is similar to that of conventional alternating current motors. Various single-phase motor starting techniques may be employed to start the rotor 54. As described above, a more practical embodiment utilizes at least two phases at 90° which results in a revolving magnetic field and as a consequence the rotor 54 rotates to provide rotary output power from the vibrating mechanism 46 in a single phase, and 46 and its counterparts in a polyphasic system.

As the mechanism 46 oscillates, the amplitude of such oscillations are sensed by the transducer 116 and applied as signals to the control system C. Also, current power demand is indicated by a signal carried in a line 120. Consequently, the control system synchronizes the engine component E to burn more or less fuel charges for supplying the demanded power levels and maintaining appropriate oscillating amplitude by the vibrator 46. The amount of rotary power extracted from the mechanical oscillation is controlled by the current which energizes coils 28.

It may, therefore, be seen that an effective system is provided for converting reciprocating mechanical energy into rotating energy at a mechanical shaft. It is also apparent that the combination of such a converter with a reciprocating internal combustion engine, and particularly a resonant form of such an engine, affords a system of several specific advantages. To summarize, it is noteworthy that the engine E is substantially free of lateral forces with the consequences of reduced friction and improved efficiency. Also, the mechanism 46 involves exceedingly durable components with the result that very long relative life and low maintenance can be anticipated.

As indicated above, the system hereof may be variously embodied in a variety of different forms using different power sources and forms of engines. Consequently, in view of the wide number of possible variations, the scope hereof shall be deemed to be defined as set forth in the following claims.

What is claimed is:

1. An energy conversion system comprising:
a first circular member including means for defining a plurality of alternator excitation magnetic poles;

a second circular member, concentric with said first circular member and including alternating current electric machine poles and windings;
a stator means of circular configuration, concentric with said circular members and affixed therebetween for concentrating magnetic flux from said poles;

and
means for oscillating one of said circular members with respect to said stator means to establish patterns of varying magnetic flux from said stator means as to revolve the other of said circular members.

2. A system according to claim 1 wherein said first circular member is external of said second circular member and is coupled to said means for oscillating to be a vibrator.

3. A system according to claim 2 further including bearing means supporting said second circular member for axial rotation.

4. A system according to claim 1 wherein said means for oscillating includes a reciprocating engine.

5. A system according to claim 4 wherein said engine comprises an internal-combustion engine including at least one piston.

6. A system according to claim 5 wherein said means for oscillating further includes spring means and said piston reciprocates at a frequency of mechanical resonance responsive to the mass in motion and the force provided by said spring means.

7. A system according to claim 6 wherein said means for oscillating further includes control means for supplying fuel to said engine selectively during certain cycles.

8. A system according to claim 7 wherein said control means further includes means for manifesting the amplitude of oscillations and current power demands on the system.

9. A system according to claim 3 wherein said second circular member comprises an induction motor rotor.

10. A vibrating-to-rotary energy conversion system according to claim 1 where the angular displacement of said one means is a sinusoidal function of time in response to a periodic tangential force which is driving it.

11. A vibrating-to-rotary energy conversion system according to claim 3 further including resilient means attached to said first circular member which is also called vibrator, for interacting with the mass of it to establish a mechanically resonant motion at which frequency driving forces are applied.

12. A vibrating-to-rotary energy converting system according to claim 11 further including an internal combustion engine having a piston to apply driving forces during the power stroke; the non-active strokes of the cycle of said engine are provided with the necessary power by the resonant motion of said vibrator which is mechanically coupled with said piston.

13. A system according to claim 12 wherein said vibrator includes magnetic poles energized by electrical windings.

14. A vibrating-to-rotary energy conversion system according to claim 13 further including control means for varying current through said electrical windings where the amount of energy extracted from the resonant motion of said engine is controlled by and is dependent on such current.

* * * * *